Oct. 12, 1965     M. J. KRANCE     3,210,784
RETRACTABLE WHEEL ASSEMBLY
Filed Feb. 24, 1964
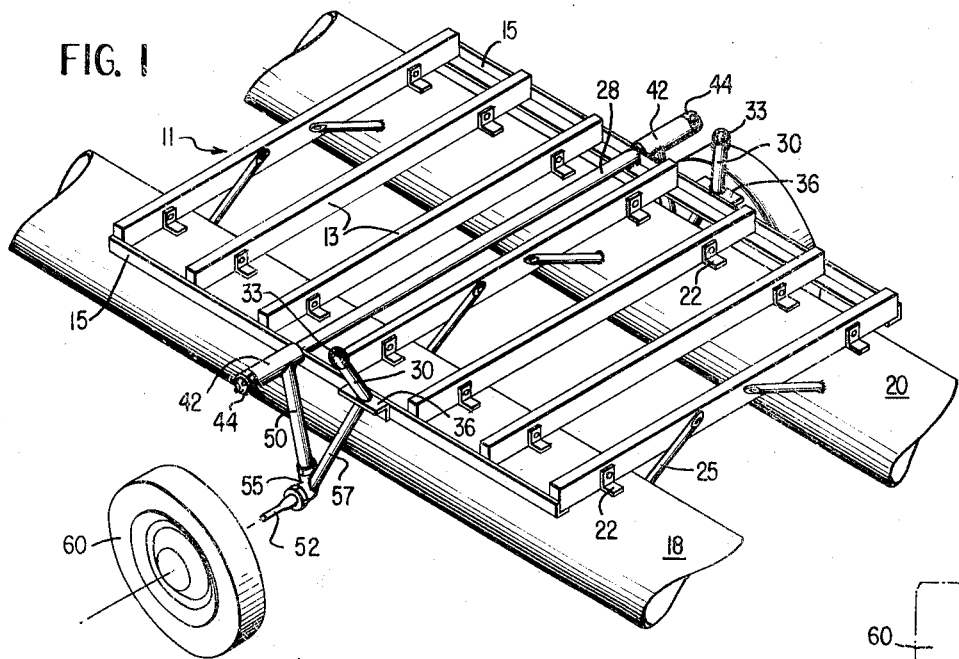
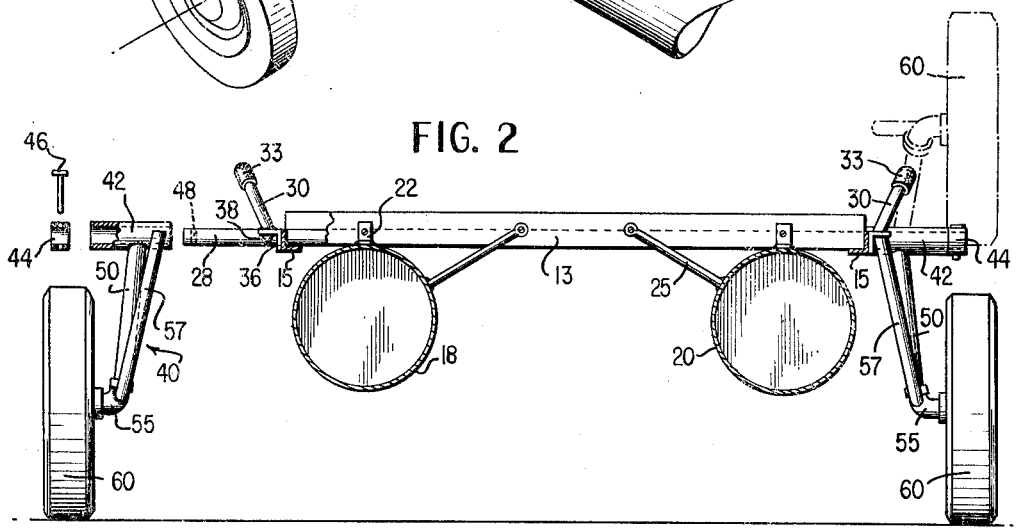
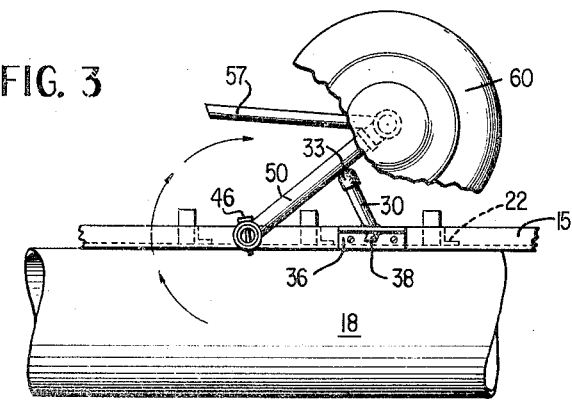
INVENTOR.
MAURICE J. KRANCE
BY
*McLean and Boustead*
ATTORNEYS.

United States Patent Office 3,210,784
Patented Oct. 12, 1965

3,210,784
RETRACTABLE WHEEL ASSEMBLY
Maurice J. Krance, 828 Adler Ave., Dickinson, N. Dak.
Filed Feb. 24, 1964, Ser. No. 346,679
10 Claims. (Cl. 9—1)

This invention relates to a novel retractable and removable wheel assembly which is of use especially with boats of the pontoon type but which finds applicability to other types of boats and other vehicles as well as other types of apparatus which on occasion may need to be moved from place to place. The retractable wheel assembly of this invention is improved over devices known to the art in the simplicity and ruggedness of its parts and the ease with which the wheel may be converted to its operative or retracted positions. The retractable wheel assembly of this invention can be made for the most part from readily available materials by well-known fabricating procedures.

The wheel assembly comprises a wheel spindle joined to the juncture of two rods. The spindle is generally at an agle of at least about 90° to this juncture which itself usually forms an acute angle. The lower ends of these rods, which usually are about equal in length, being fastened together at the juncture, forces directed to the wheel are transmitted from the side of the vehicle to the spindle without putting undue force on any other single member and thus provides firm and strong support to the vehicle by the wheel.

The first rod has attached to its upper end a cylindrical tube and the angle of attachment puts this tube about parallel to the spindle. This tube slips over the end of an axle fastened to the vehicle and is rotatably held to the axle. Thus, by removing the tube from the axle the entire wheel assembly may be removed, while rotation of the assembly around the axle provides for a change from operative to retracted position.

The second rod preferably is rigid, as is the first. However, shock absorbing qualities may be given to this rod. The upper end of this second rod bears against the vehicle in operative position and usually is provided with a stabilizing coupling with the vehicle. Preferably a flange is provided on the vehicle and this flange may suitably be provided on its underside with a knob which fits into the upper end of the second rod. The flange also may be provided on its upper side with an upwardly projecting stop member to support the wheel assembly in retracted position.

A pontoon boat will generally comprise two or more usually cylindrical pontoons held together by a frame which they support when in the water. The removable and retractable wheel assembly of this invention may be applied to such boats by fastening the axle to the frame in such a way that the ends of the axle overhang the frame. The flanges also may be attached to the frame, properly spaced from the axles to give contact with the second rod of the wheel assembly on either side of the frame.

The invention will be better understood by reference to the accompanying drawing in which FIGURE 1 is a perspective view of the retractable wheel assembly of this invention in operating position as applied to a pair of tubular pontoons;

FIGURE 2 is a horizontal view, partly cut away and partly exploded, of the device of FIGURE 1 showing the wheel in retracted position in phantom lines; and FIGURE 3 is a fragmentary view showing the wheel assembly in retracted position.

The wheel assembly is supported by or supports a frame indicated generally by 11, which is composed of the cross-members or deck supports 13 which may be made, for example, of wood, and the end members or channel or angle irons 15. The frame ordinarily is about half the length of the boat and is placed atop a buoyant member or members which constitute a hull. In the drawing, the buoyant members comprise the pontoons 18 and 20 which may be attached to the frame 11 by any suitable means, for example, the clips 22 and the struts 25. Generally, the pontoons 18 and 20 are made of metal and the clips 22 and struts 25 may conveniently be welded to them.

Axle 28 is fastened at right angles to channel or angle irons 15, for example, by welding and, as can be seen, extends outward on either side of the frame 11. Projecting upwardly from the angle irons 15 are one or more rest members 30 which suitably are provided with the resilient caps 33. The rest members 30 may be suitably attached to the frame members 15 by means of flanges 36. The underside of flange 36 may be provided with stabilizing knob 38.

The wheel assembly is indicated generally as 40 in FIGURE 2. It comprises a tube 42 having an internal diameter suitable for fitting somewhat snugly around the end of the axle 28. It is shorter than the free end of the axle, is of a length only slightly longer than the horizontal span of rods 50 and 57, and is held rotatably on the axle for example by the collar 44 and pin 46 which passes through the collar and the hole 48 near the end of axle 28.

To the tube 42 a rod 50 is fastened at a slight outward angle, say about 7° from the normal. Spindle 52 is fastened to the rod 50 at an angle sufficient to make the spindle about parallel to the plane of the frame 11. For this purpose the lower end of rod 50 may be threaded, and standard pipe elbow 55 attached thereto with a spindle 52 suitably affixed to the elbow. A second rod 57 is fastened to the juncture of the first rod 50 and the spindle 52. This second rod 57 makes an angle of about 45° with the first rod 50 and is slightly offset so that in assembled position it will be centered on the knob 38 which will be inserted into the end of rod 57. Spindle 52, of course, supports the wheel 60 in rotatable position, and, as can be seen, makes an angle of at least 90° with the juncture of the two rods.

Although it has been found that no shock absorbers are ordinarily needed in this wheel assembly, such may be provided for example by a resilient mounting of flange 36, by use of a coil spring, etc.

Standard, readily available steel piping and tubing may be used to make most of wheel assembly 40. The tube 42 may be a 10 inch length of pipe; the first rod 50 may be a pipe about 18 inches in length and 2 inches in diameter. The connection 55 may be a standard 2 inch pipe elbow. Second rod 57 may be a 1¼ inch diameter pipe 18 inches long. Wheel 60 may be a standard automobile wheel.

The flange 36 may be an 8 inch length of 2 x 2 inch angle iron and stabilizer 38 may be a 1 inch pipe nipple positioned and tapered to accept the tube 57. As can be seen, in retracted position wheel assembly 40 is supported by the rest member 30 which may be a 7 inch length of 1¼ inch diameter tubing welded to the flange 36 at about 20° to the normal.

It is apparent that the provision of removable pin 46 and collar 44 allows the entire wheel assembly 40 to be easily removed from the axle 28 if it is not necessary to transport the boat often. Also, it is apparent that the frame 11 can be attached to the lower portion of other types of water craft or that the axle 28 and flange 36 alone could be suitably fastened to the top, bottom or mid-section of other hulls or vehicles to adapt them to the retractable wheel assembly device of this invention.

It is claimed:

1. A retractable and detachable wheel assembly comprising a wheel spindle fastened to the rigid juncture of the lower end of two straight rods, said juncture forming an acute angle between the rods, the upper end of the first of said rods being fastened to a horizontally disposed hollow cylindrical tube, said tube being of a length only slightly longer than the horizontal extension of said two straight rods and rotatable more than 180° on an axle to provide for maintenance of the assembly in a retracted position by gravity and being attachable to said axle by a collar mounted on said axle, the second of said rods being adapted to bear against a vehicle in the operable position of the wheel assembly.

2. The assembly of claim 1 in which said hollow tube is about parallel to said spindle.

3. The assembly of claim 1 in which the spindle forms an angle greater than about 90° with the angle of said rods at said juncture.

4. In combination with a vehicle having an axle attached thereto and overhanging the side of the vehicle and a flange attached thereto in spaced relation to the axle, a detachable wheel assembly movable from an operable to a retracted position, comprising a wheel spindle fastened to the juncture of the lower end of two rods, said juncture forming an acute angle between the rods, the upper end of the first of said rods being fastened to a hollow cylindrical tube, said tube being rotatable more than 180° on said axle, sufficient to maintain the retracted assembly position by gravity, and being retained on said axle by a removable collar mounted on said axle, the second of said rods bearing against said flange in the operable position of the wheel assembly, said collar being the sole retaining means for said assembly in the retracted position.

5. The assembly of claim 4 in which the flange is provided with a stabilizer knob which fits into the upper end of said second rod.

6. The assembly of claim 4 in which the vehicle is provided with an upwardly projecting stop member against which the first of said rods rests due to the force of gravity when the wheel assembly is in retracted position.

7. An apparatus of the type described comprising an axle and two flanges attached to a vehicle, said axle being provided at each end with means for attaching a collar, each of said flanges being spaced equally from the axle on opposite sides of said vehicle and each being provided on its underside with a stabilizer knob, and a wheel assembly, each wheel assembly comprising a wheel spindle fastened at an angle of at least about 90° to the rigid juncture of the lower ends of two straight rods, said juncture forming an acute angle, the upper end of the first of said rods being fastened to a hollow cylindrical tube, said tube being rotatably holdable on said axle by said attachment of a collar and being movable independently of motion of another wheel assembly from assembly operative position to assembly retracted position by rotation of said tube, the upper end of the second of said rods fitting over said knob when the wheel assembly is in operative position, said second rod being out of contact with the vehicle when the assembly is in retracted position.

8. The apparatus of claim 7 in which the vehicle is a boat.

9. The apparatus of claim 7 in which the vehicle is a pontoon boat comprising pontoons supporting a frame, said axle and flanges being rigidly attached to said frame.

10. The apparatus of claim 8 in which the wheel assembly is above the water line of the boat in the retracted position.

References Cited by the Examiner
UNITED STATES PATENTS

| | | |
|---|---|---|
| 2,460,935 | 2/49 | Henningsen. |
| 2,570,528 | 10/51 | Davis _____ 9—1 |
| 2,759,201 | 8/56 | McKinney _____ 9—1 |
| 3,135,975 | 6/64 | Andranigian _____ 9—1 |

MILTON BUCHLER, *Primary Examiner.*

FERGUS S. MIDDLETON, *Examiner.*